UNITED STATES PATENT OFFICE.

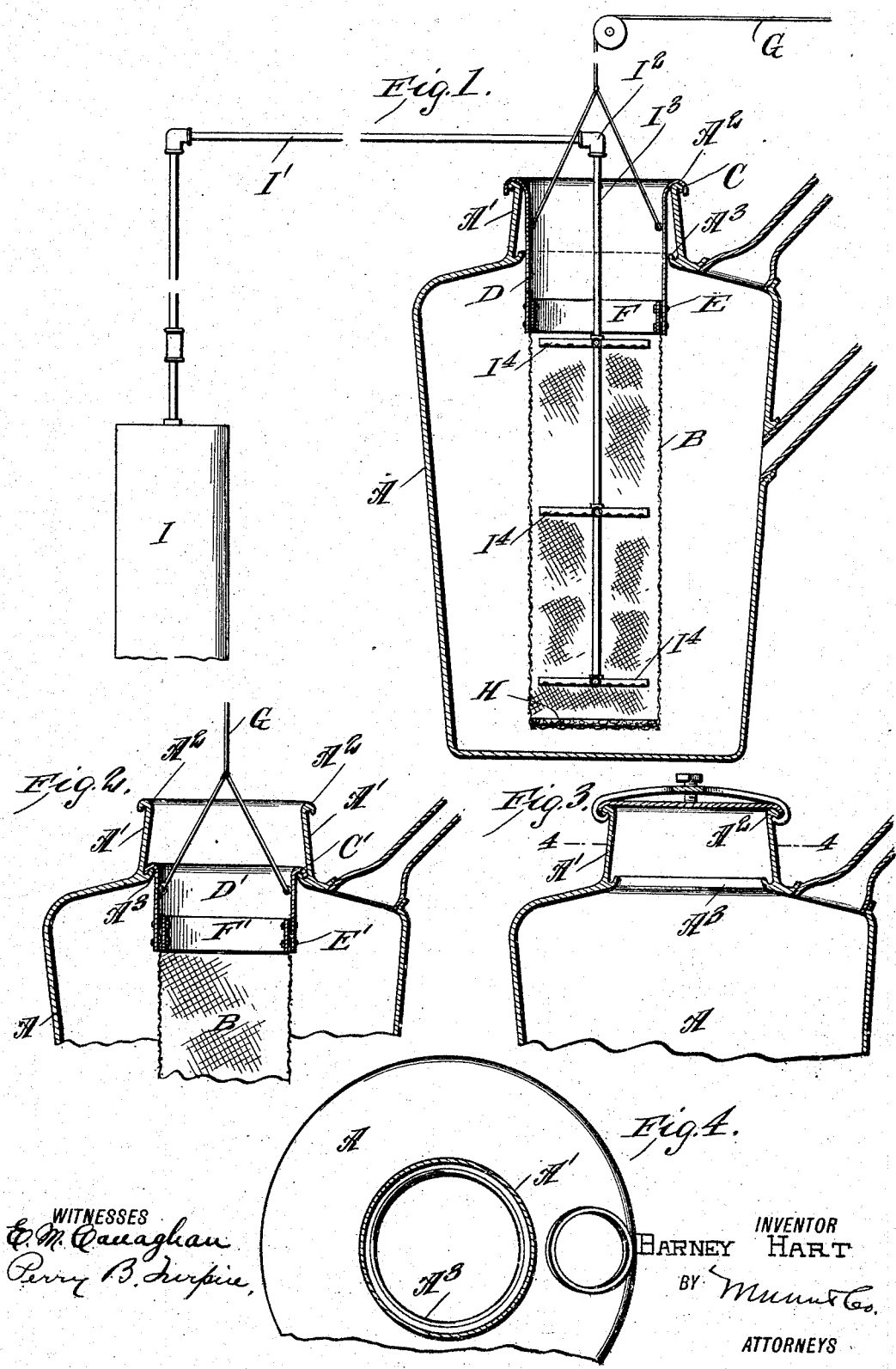

BARNEY HART, OF JACKSONVILLE, FLORIDA.

TURPENTINE-STILL.

947,662. Specification of Letters Patent. Patented Jan. 25, 1910.

Application filed June 16, 1909. Serial No. 502,611.

*To all whom it may concern:*

Be it known that I, BARNEY HART, a citizen of the United States, and a resident of Jacksonville, in the county of Duval and State of Florida, have made certain new and useful Improvements in Turpentine-Stills, of which the following is a specification.

This invention is an improvement in turpentine stills and particularly in means for purifying the gum, etc., by straining the same to avoid the deleterious effect of wood, bark and other impurities being permitted to remain in the still; and the invention consists in certain novel constructions and combinations of parts as will be hereinafter described and claimed.

In the drawing—Figure 1 is a sectional elevation of an apparatus embodying my invention, parts being broken away and some parts being shown in elevation. Fig. 2 is a vertical longitudinal section of the upper portion of the still with the strainer supported from the internal annular hook-like flange instead of from the lip at the end of the still neck. Fig. 3 is a vertical section of the upper portion of the still, the strainer being removed and a cover being applied to the still neck, and Fig. 4 is a sectional plan view on about line 4—4 of Fig. 3.

By my invention I seek to provide a novel construction whereby to strain the gum, as it is placed in the still for the distillation of spirits of turpentine and the production of rosin, the freeing of the gum from refuse matter, improving the quality and grade of the turpentine, rosin and other products.

The still A may in general respects be of ordinary construction and in the form of a circular copper or other pot. The neck $A'$ of this still is sufficiently large to permit the introduction of a strainer B, and such strainer is provided at its upper end with an outwardly and downwardly turned portion C, forming a hook. This hook C may be of sufficient diameter to engage upon the lip $A^2$ at the upper end of the neck $A'$ as shown in Fig. 1, or the hook $C'$, as shown in Fig. 2, may be of such smaller diameter as to pass down within the neck $A'$ and engage upon the annular upturned hook-like flange $A^3$ at the base of the neck $A'$ and at the diameter of such neck $A'$ with the body of the still, as shown in Figs. 1, 2 and 3 of the drawing.

In the construction shown in Fig. 1 the strainer B has at its upper end a collar D, bolted at its lower end at E to the strainer B and having the hook C at its upper end to engage upon the lip of the neck $A'$.

In the construction shown in Fig. 2 the strainer has at its upper end a collar $D'$ similar to the collar D except that it is not so long and this collar $D'$ is bolted at its lower end $E'$ to the upper end of the strainer, reinforcing bands F, as shown in Fig. 1, and $F'$, as shown in Fig. 2, being provided at the juncture of the collars and strainers in order to secure a tight joint.

Any suitable hoisting means, as shown at G and $G'$ may be employed to raise and lower the strainer, as shown in Figs. 1 and 2 of the drawing.

The strainer is usually made of such length first to extend to a point near the bottom of the still as shown in Fig. 1 and may be made of any suitable wire netting of such size of mesh as to properly strain the refuse from the gum, and I find it desirable in practice to provide a filter bed H at the lower end of the strainer, which filter bed may be a layer of cotton batting of suitable thickness, as shown in Fig. 1 of the drawing.

It is sometimes desirable to heat the gum while in the still, thus supplementing the heat of the still and furnishing the desired melting heat for the gum when the same is supplied to a cold still, and I also find it desirable to provide for withdrawing the heating devices whenever desired. As shown the heating devices comprise a suitable boiler I and a pipe $I'$ leading therefrom and suitably jointed at $I^2$ above the still with the depending pipe $I^3$ extending within the strainer and having suitable discharge branches $I^4$ which may discharge steam downwardly on to the gum in the strainer, thus melting the same and facilitating the straining action. When the heating operation is complete, whether before or after the completion of the straining operation, the steam pipe with its discharge devices $I^4$ may be withdrawn from the strainer and the still, after which the strainer may be removed and the still closed as shown in Fig. 3 and the distilling operation be proceeded with.

By the described operation it will be understood that the gum of the tree is dumped into the strainer and heat applied until the gum has melted and strained through the strainer, when the latter with the refuse of wood, foreign substances and the like, can be lifted out of the still before any high degree of heat is applied to the still.

As shown at the right in Figs. 1, 2 and 3, the still may be provided with outlet pipes for conducting the fumes to a condenser or elsewhere.

I claim—

1. A still for turpentine and the like having an upwardly projecting neck and an internal annular upwardly projecting hook or flange below the lip of said neck combined with a strainer provided at its upper end with a collar having an outwardly and downwardly turned hook-like flange, and a heater including a steam pipe extending downwardly within the strainer and provided therein with discharge devices, all substantially as and for the purpose set forth.

2. A still for turpentine and the like having an upwardly projecting neck and provided below the upper edge or lip of said neck with an internal annular hook-like flange adapted to receive and support a strainer, a strainer suspended from said support and a steam pipe within the strainer, substantially as set forth.

3. A turpentine still having an upwardly projecting neck, a strainer fitting removably in the still and projecting at its upper end into the said neck, and a heater within the strainer and removable therewith from the still, substantially as set forth.

4. The combination with a turpentine still, of a strainer therein and provided at its upper end with hook-like devices engaging with the still, whereby the strainer is removably suspended within the still, and a steam pipe within the strainer and removable therewith from the still, substantially as set forth.

5. The combination with a still and a strainer within the still, of a heating pipe extended into the strainer within the still, substantially as set forth.

6. A turpentine still combined with a strainer having a collar secured to its upper end and provided with a hook-like flange whereby the strainer may be suspended within the still, and a reinforcing band at the juncture of the collar with the strainer, substantially as set forth.

7. A turpentine still combined with a strainer suspended therein, and a heating pipe extending into the strainer within the still and provided within the strainer with branches having discharge openings, substantially as set forth.

BARNEY HART.

Witnesses:
GEORGE W. WILSON,
GEORGE T. HILL.